Figure 1:
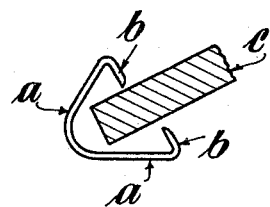

June 17, 1924.

W. W. HARTLEY 1,498,275

COUPLING DEVICE FOR DRIVING BELTS

Filed Sept. 15, 1923

Inventor:
William Wells Hartley

Attorney:

Patented June 17, 1924.

1,498,275

UNITED STATES PATENT OFFICE.

WILLIAM WELLS HARTLEY, OF MANCHESTER, ENGLAND, ASSIGNOR TO HENRY COCK-HILL & SONS LIMITED, OF MANCHESTER, ENGLAND, A BRITISH LIMITED LIABILITY COMPANY.

COUPLING DEVICE FOR DRIVING BELTS.

Application filed September 15, 1923. Serial No. 662,970.

*To all whom it may concern:*

Be it known that I, WILLIAM WELLS HARTLEY, subject of the King of Great Britain and Ireland, and resident of Manchester, in the county of Lancaster, England, have invented Improvements in Coupling Devices for Driving Belts, of which the following is a specification.

This invention relates to improvements in coupling devices for driving belts and has particular reference to that class of coupling composed of a number of separate wire hooks of V shape in side elevation with the legs of the V turned inward to provide pointed portions for entering the end of the belt near to the point. Hooks of the character referred to are attached to the belt ends either by the pointed portions being driven thereinto by means of a wooden mallet while the hooks are held in a suitable anvil to keep them spaced at the right distance from each other, or the hooks are pressed into the belt material by a mechanically operated press or by special hand tools for the purpose, the object in all cases being to leave the looped ends of the hooks projecting beyond the extreme end of the belt so that when the two ends of the latter are brought together the loops inter-engage and are held in engagement by a pin of catgut, wire or the like, so that the joint acts as a hinge when the belt is passing round a pulley. It has been found in practice that belt hooks made in the manner described have certain defects, particularly in that the pointed ends of the hooks when driven into the belt material are substantially at right angles to the upper and lower faces of the belt and thus have a tendency to pull out as a result of the tension set up in the belt and in the bending of the latter around pulleys and particularly pulleys of small diameter.

The object of my invention is to avoid the defects referred to and consists essentially in bending each arm of the V shaped hook outwardly a short distance from the hooked end so as to form curved loops from which the actual hook or point is further turned inwards at an acute angle to the bent portion of the arm. The arrangement is such that when the pointed ends of such loops are being driven or pressed into the belt material and are finally driven home into the belt material the hooked portions will embed themselves in a direction longitudinally of the belt and form a clinch in each case which effectually prevents the hook being pulled out of the belt when under the ordinary stresses set up in practice.

The invention will now be fully described with reference to the accompanying drawings, in which—

Figure 2:
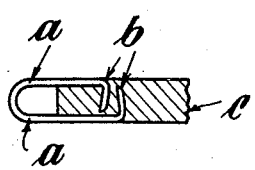
Figure 3:
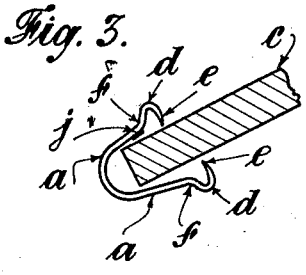
Figure 4:
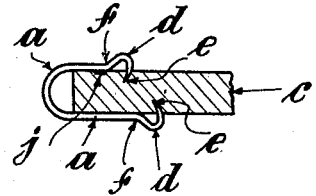
Figure 5:
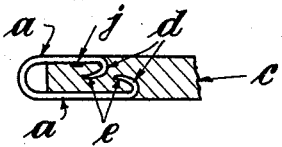
Figure 6:
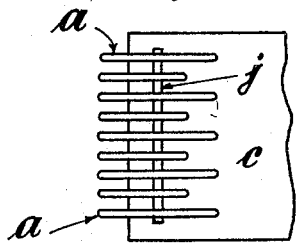

Figure 1 shows a side elevation of a hook of ordinary construction in position ready for being driven or pressed in the driving belt;

Figure 2 similar in view to Figure 1 showing the old form of hook as it appears when pressed or driven in the belt;

Figure 3 side elevation of my improved form of hook prior to being pressed into the belt material;

Figure 4 sectional side elevation of my improved hook shown partly pressed into the belt material;

Figure 5 similar view to Figure 4, showing my improved form of hook as it finally appears when pressed into the belt material, and Figure 6 plan of a series of hooks after being pressed into the belt.

Referring to the old form of hook shown in Figures 1 and 2 the said hook is formed with straight arms $a$ and pointed portions $b$ bent to an angle thereto so that when driven into the belt $c$ the pointed ends assume the position shown in Figure 2. My invention consists as is shown in Figures 3 to 6 in forming the arms $a$ of each hook with curved loops $d$ by bending the arms substantially as shown, so that when pressing or driving the hooks into the belt material the pointed ends $e$ first pass partly into the belt as shown in Figure 4 whilst the arms $a$ lie substantially parallel to and on the upper and lower faces of the belt $c$, such arms being embedded in the belt by the further application of pressure so as to become flush with the upper and lower faces of the belt. A certain amount of resistance to the embedding of the arms $a$ in the belt material is offered at the points $f$ and as the loops $d$ stand further away from the faces of the belt they receive the pressure first and consequently turn about the points $f$ as fulcrums and thereby assume the clinching position in the material of the belt shown in Figure 5 by the time the arms $a$ become flush with the upper and lower faces of the belt. The hooks therefore get a firm hold of the belt material to resist the longitudinal tensional stresses set up in the belt when at work, whilst also resisting being pulled out when the belt is passing round the pulleys.

I use in conjunction with the improved form of hook as described a bar $j$ secured thereto which acts to keep the hooks spaced before being pressed into the belt and also as a bar to resist the tensional stresses on the belt by becoming embedded in the belt material as shown in Figures 4 and 5. The bar assists in preventing the hooks being pulled out of the belt material. I am of course aware that such a bar has been employed in conjunction with hooks of a somewhat similar type to the hook shown in Figure 1, but with the arms $a$ of equal length.

The curved loops shown in Figures 3 to 5 may be employed in conjunction with or as part of hooks formed with arms $a$ of equal length although I prefer to use them in hooks having arms of different lengths as shown in Figures 3 to 5, and with the short arms alternating with the long arms at each side of the belt as shown in the plan in Figure 4.

I claim:—

1. A belt hook of the V shaped type for the coupling together of two ends of a driving belt, characterized in that each limb of the hook is bent outwardly near the pointed end thereof and the pointed end turned inwardly, the outwardly bent portion thus forming a hump which will be laid parallel with the main portion of the limb by the clinching tool employed and thus give to the inwardly turned hook ends a clinching hold in the direction of the length of the belt.

2. A belt hook of the V type for the coupling together of two ends of a driving belt characterized in that each limb of the belt hook is bent outwardly near the pointed end thereof and the pointed end turned inwardly, the outwardly bent portion thus forming a hump which will be laid parallel with the main portion of the limb by the clinching tool employed, thus giving to the inwardly turned hook ends a clinching hold in the direction of the length of the belt, the limbs of the belt hook being of unequal length, and the points of said limbs when clinched lying in the same plane within the belt material.

In testimony whereof I have hereunto set my hand.

WILLIAM WELLS HARTLEY.

Certificate of Correction.

It is hereby certified that the name of the assignee in Letters Patent No. 1,498,275, granted June 17, 1924, upon the application of William Wells Hartley, of Manchester, England, for an improvement in " Coupling Devices for Driving Belts," was erroneously written and printed as " Henry Cockhill & Sons Limited," whereas said name should have been written and printed as *Henry Cockill & Sons Limited*, as shown by the records of assignments in this office; and that the said Letters Patent should be read with this correction therein that the same may conform to the record of the case in the Patent Office.

Signed and sealed this 2d day of September, A. D. 1924.

[SEAL.] KARL FENNING,
*Acting Commissioner of Patents.*